United States Patent
Duron et al.

(10) Patent No.: US 7,403,120 B2
(45) Date of Patent: Jul. 22, 2008

(54) REVERSE INFRASTRUCTURE LOCATION SYSTEM AND METHOD

(75) Inventors: Mark William Duron, East Patchogue, NY (US); Raj Bridgelall, Morgan Hill, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 395 days.

(21) Appl. No.: 10/954,967

(22) Filed: Sep. 29, 2004

(65) Prior Publication Data

US 2006/0071790 A1    Apr. 6, 2006

(51) Int. Cl.
*G08B 1/08* (2006.01)
*G08B 13/14* (2006.01)
*G08B 5/22* (2006.01)
*H04Q 7/00* (2006.01)
*H04Q 7/20* (2006.01)
*G08G 1/123* (2006.01)
*G06F 19/00* (2006.01)
*G06F 7/00* (2006.01)
*G06K 19/06* (2006.01)
*G01S 1/00* (2006.01)
*G01C 22/00* (2006.01)

(52) U.S. Cl. ............... 340/572.1; 340/539.13; 340/825.49; 340/988; 342/357.01; 342/357.06; 455/456.1; 455/456.3; 235/385; 235/386; 235/491; 235/492; 700/214; 700/225; 701/23; 701/24

(58) Field of Classification Search ............. 340/572.1, 340/825.49, 539.1, 539.21, 539.23, 539.13, 340/988; 235/385, 491, 386, 492; 342/450, 342/458, 463, 357.01, 357.06, 357.02; 455/456.1, 455/456.3; 700/214, 225; 701/23, 24
See application file for complete search history.

(56) References Cited

U.S. PATENT DOCUMENTS

| | | | | |
|---|---|---|---|---|
| 5,260,694 A | * | 11/1993 | Remahl | 340/674 |
| 5,300,875 A | * | 4/1994 | Tuttle | 320/138 |
| 5,646,616 A | * | 7/1997 | Komatsu | 340/988 |
| 5,796,362 A | * | 8/1998 | Ayasli et al. | 342/6 |
| 5,917,425 A | * | 6/1999 | Crimmins et al. | 340/825.49 |
| 5,974,368 A | * | 10/1999 | Schepps et al. | 340/5.61 |
| 6,396,413 B2 | * | 5/2002 | Hines et al. | 340/825.49 |
| 6,414,626 B1 | | 7/2002 | Greef et al. | |
| 6,542,270 B2 | * | 4/2003 | Perkins et al. | 398/140 |
| 6,563,417 B1 | * | 5/2003 | Shaw | 340/10.1 |
| 6,750,769 B1 | * | 6/2004 | Smith | 340/572.1 |
| 6,865,347 B2 | * | 3/2005 | Perkins et al. | 398/172 |
| 6,868,073 B1 | * | 3/2005 | Carrender | 370/278 |
| 6,900,762 B2 | * | 5/2005 | Andrews et al. | 342/463 |

(Continued)

*Primary Examiner*—George A Bugg
*Assistant Examiner*—Lam P Pham
(74) *Attorney, Agent, or Firm*—Ingrassia Fisher & Lorenz, P.C.

(57) ABSTRACT

Methods and apparatus are provided to locate a terminal within a workspace. Radio frequency identification (RFID) tags are provided in known locations, preferably in, on or adjacent the light fixtures or other workspace infrastructure. The terminal comprises an RFID tag interrogation transceiver, processor and memory. The transceiver interrogates the tags which respond with information correlatable with their unique locations. The terminal determines its locations relative to the known locations of responding tags by, for example, varying its transmit power and/or receiver sensitivity and/or by trilateration using, for example, phase or time difference of arrival measurements on the tag response signals. Once it has determined its own location it may transmit or otherwise announce its location as desired by the user. In a preferred embodiment, the natural electromagnetic radiation and/or RADAR cross section backscatter from fluorescent type fixtures, modulated with their position information, acts as the RFID infrastructure beacon.

15 Claims, 8 Drawing Sheets

U.S. PATENT DOCUMENTS

| | | | |
|---|---|---|---|
| 6,922,173 B2 * | 7/2005 | Anderson | 343/701 |
| 6,992,581 B2 * | 1/2006 | Reisman et al. | 340/539.12 |
| 7,030,761 B2 * | 4/2006 | Bridgelall et al. | 340/572.2 |
| 7,119,738 B2 * | 10/2006 | Bridgelall et al. | 342/129 |
| 7,151,979 B2 * | 12/2006 | Andersen et al. | 700/214 |
| 2005/0140507 A1 * | 6/2005 | Nam et al. | 340/539.13 |
| 2005/0200477 A1 * | 9/2005 | Lindero | 340/539.13 |
| 2006/0022038 A1 * | 2/2006 | Hewlin et al. | 235/385 |

* cited by examiner

REVERSE INFRASTRUCTURE LOCATION SYSTEM AND METHOD

TECHNICAL FIELD OF THE INVENTION

The present invention generally relates to position location, and more particularly to determining the position of a mobile object in real time.

BACKGROUND OF THE INVENTION

There are many applications today where it is desired to determine the location of a moveable object. For example, there is often a need to locate a moveable person, forklift, pallet or other cargo carrier in a warehouse, storage depot, factory or other area. In the past this has often been accomplished by placing a radio frequency (RF) beacon on the moveable object and then providing multiple infrastructure receivers at known locations in the area that receive signals from the moveable object and through trilateration or other proximity detectors determine the location of the moveable object within the area. While this arrangement works, it suffers from a number of disadvantages well known in the art, as for example, complexity, high installation cost, limited resolution, undesirably high power drain for the mobile beacon transmitter, and so forth. A further difficulty with this approach is that it is often very difficult to retrofit an existing structure or area to reliably use this approach since it is sensitive to multi-path, reflections and other structure dependant signal artifacts.

The positions of the trilateration receivers are known and the location of the moveable object (and its beacon transmitter) is unknown until its signal is read and analyzed by the trilateration receivers. The moveable object itself is ordinarily not self-aware, that is, it does not know its own location unless such information is sent to it from the base station managing the trilateration receivers or provided by some other means. Ordinarily, such a system cannot easily handle multiple moveable objects unless different frequencies and duplicate or multi-frequency trilateration receivers are provided, thereby adding further complexity. The infrastructure cost is significant because of the complexity and interconnection of the fixed trilateration receivers.

In a different application, it is also known to use radio frequency identification (RFID) tags to identify and at least crudely track large numbers of individual moveable items within an area. For example, each pallet or package of goods entering a storage yard, warehouse, factory or other area can be equipped with an RFID tag bearing a unique identifier (unique ID). When interrogated by an RFID tag reader, each tag responds with its unique ID indicating that it is present within signaling range of the reader. Thus, its position is known to be within the signaling range of the RFID tag reader. The RFID tags may be passive, semi-passive or active, depending upon the needs of the user. Such RFID tags are well known and widely available. In the conventional RFID tag installation, the location of the tag reader may or may not be known and the presence and rough location of the RFID tags themselves are unknown until interrogated by the reader. A single tag reader can detect the presence of a large number of tags. The ability of such a system to locate the RFID tags depends upon the proximity of the tag reader and it is ordinarily used to determine whether the tagged objects are present or absent, rather than to determine their exact location.

Thus, a need continues to exist for an improved position locating apparatus and method, especially one that takes advantage of present day RFID tag technology. Further it is desirable that such improved system be easy to retrofit into existing structures and areas. It is further desirable that such a system be able to take advantage of conventional infrastructure that may already exist in the area desired to be equipped with a position locating system and not require significant new infrastructure installation.

Accordingly, it is desirable to provide an improved position measuring apparatus and method, especially for measuring the position of moveable objects within an area or building. In addition, it is desirable that the sensing apparatus and method be simple, rugged and reliable and not require any substantial modifications to building infrastructure or the installation of significant complex new infrastructure. Furthermore, other desirable features and characteristics of the present invention will become apparent from the subsequent detailed description and the appended claims, taken in conjunction with the accompanying drawings and the foregoing technical field and background.

BRIEF SUMMARY OF THE INVENTION

An apparatus is provided for self-locating a terminal within a workspace. Radio frequency identification (RFID) tags are provided in known locations, preferably in, on or adjacent light fixtures or other workspace infrastructure. The terminal comprises an RFID tag interrogation transceiver, processor and memory. The transceiver interrogates the tags which respond with information correlatable with their unique locations. The terminal determines its locations relative to the known locations of responding tags by, for example, varying its transmit power and/or receiver sensitivity and/or by trilateration using, for example, phase or time difference of arrival measurements on the tag response signals. Once it has determined its own location it may transmit or otherwise announce its location as desired by the user. The infrastructure tags can be powered by being optically or electromagnetically coupled to the light fixtures. In a preferred embodiment, electromagnetic radiation associated with ionization and de-ionization of the active gas of the light fixture is modulated to turn the light fixture itself into an RFID beacon providing positional information.

A method is provided for locating in real time a moveable terminal within a workspace containing an array of radio frequency identification (RFID) tags associated with the workspace infrastructure, preferably the light fixtures. The method comprises having the terminal send interrogation signal(s) to the fixed tags, receiving responses therefrom and determining the terminal location based on the known locations of the responding tags. In a proximity approach the terminal varies the transmit power and/or receiver sensitivity to detect only the closest tags which thereby give its approximate location. Where greater precision is desired, the tag responses are evaluated using phase and/or time difference of arrival to determine ranges to the tags which are then used by trilateration to determine the position of the terminal relative to the responding tags. In a preferred embodiment, the light fixtures themselves preferably function as passive back-scatter or duplex beacon sources to provide unique positional information.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

It has been found that many of the problems associated with prior art real time position locating systems can be avoided by using what can be referred to as "reverse RFID" or "reverse infrastructure" position location. In this arrangement, multiple RFID tags are provided in known locations within the work area, and the mobile terminal acts as a tag interrogator and/or reader to determine its position based on the known positions of the tags it interrogates. In the preferred embodiment, the tags are located in, on or in association with light fixtures since such infrastructure generally already exists in most buildings or areas of interest, and tag installation cost is minimal. However, other convenient infrastructure elements can also be used.

Figure 1:
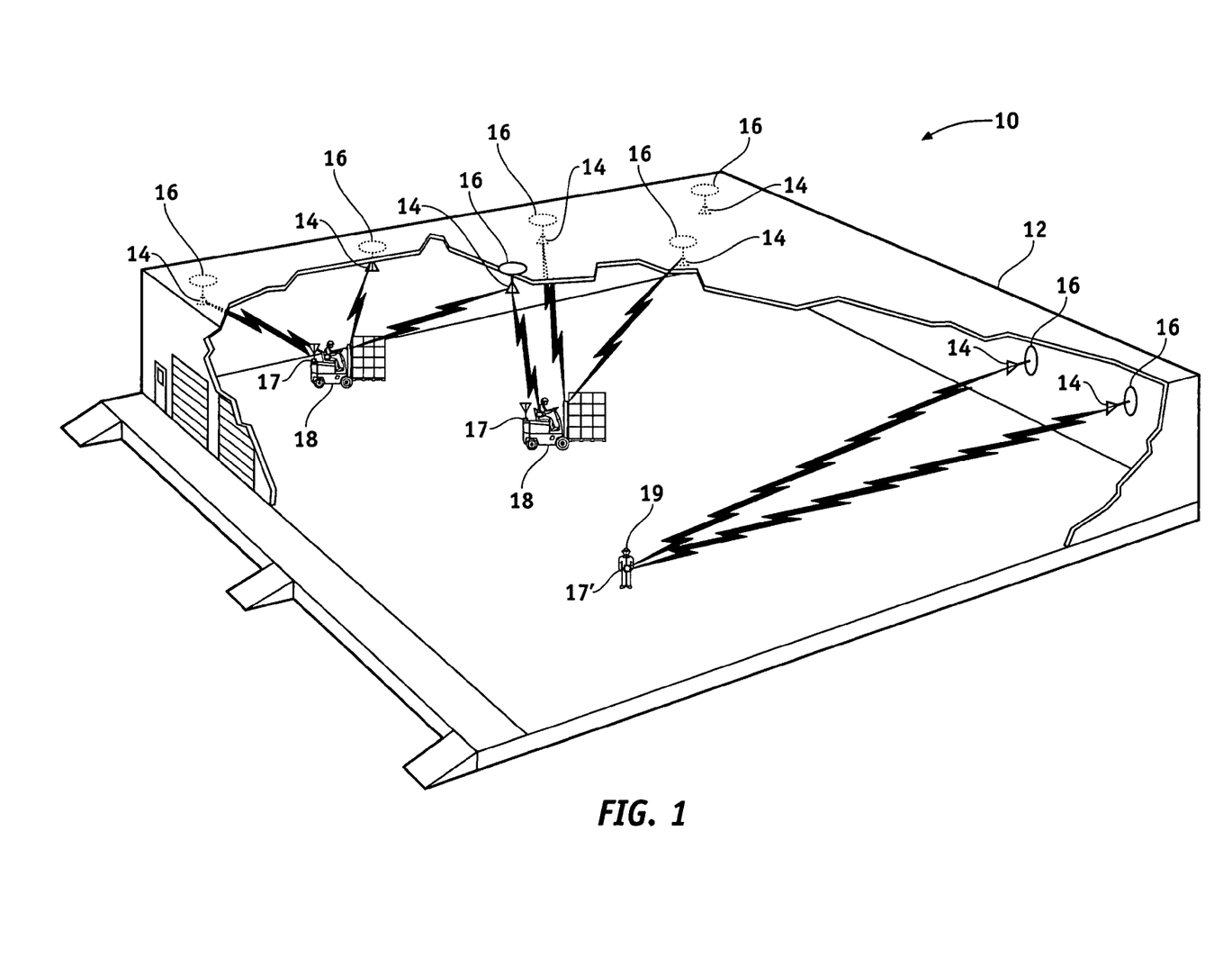
FIG. 1 is a simplified, partial cut-away, perspective view of a mobile device locating system operating according to the present invention.

FIG. 1 is a simplified, partial cut-away, perspective view of mobile device locating system 10 according to the present invention. System 10 is shown, by way of example, installed in warehouse or other goods storage area or workspace 12. For simplicity of illustration, the storage racks, pallets, assembly or packing lines and other facilities that would ordinarily be present in warehouse or workspace 12 are omitted from FIG. 1. While area 12 is identified as a warehouse or goods storage area, this is merely for convenience of description and not intended to be limiting. Area 12 can equally well be a factory, office or administrative area, hospital or other care facility, interior or exterior space or any facility where items, terminals and/or people whose current location is desired to be monitored are being used. Hence, the words "warehouse" and "workspace" are intended to include such alternative locations.

System 10 comprises infrastructure RFID tags 14 installed in this example on light fixtures 16, and mobile terminal and tag readers 17, 17'. In the example of FIG. 1, mobile terminal 17 is attached to or associated with forklift 18, and mobile terminal 17' is being carried by person 19. It will be understood that forklift 18 and person 19 are merely exemplary and not intended to be limiting and that mobile terminals 17, 17' can be installed on or associated with any moveable object. Thus, the words "forklift", "person" and "moveable object" are intended to include all manner of non-fixed items, objects, goods or persons whose position is desired to be located and/or monitored in real time. Non-limiting examples are pallets, dollies, material transporters, robotic pickers, vehicles, trailers, workers and so forth. Infrastructure RFID tags 14 are mounted in known locations. Light fixtures 16 are a convenient and generally existing infrastructure that may be used for this purpose but any other infrastructure equipment present in sufficient quantity and distribution may also be used. Accordingly, while placing infrastructure RFID tags 14 in, on or associated with light fixtures 16 is preferred, the use of other infrastructure elements as locations for RFID tags 14 is not excluded.

Figure 2:
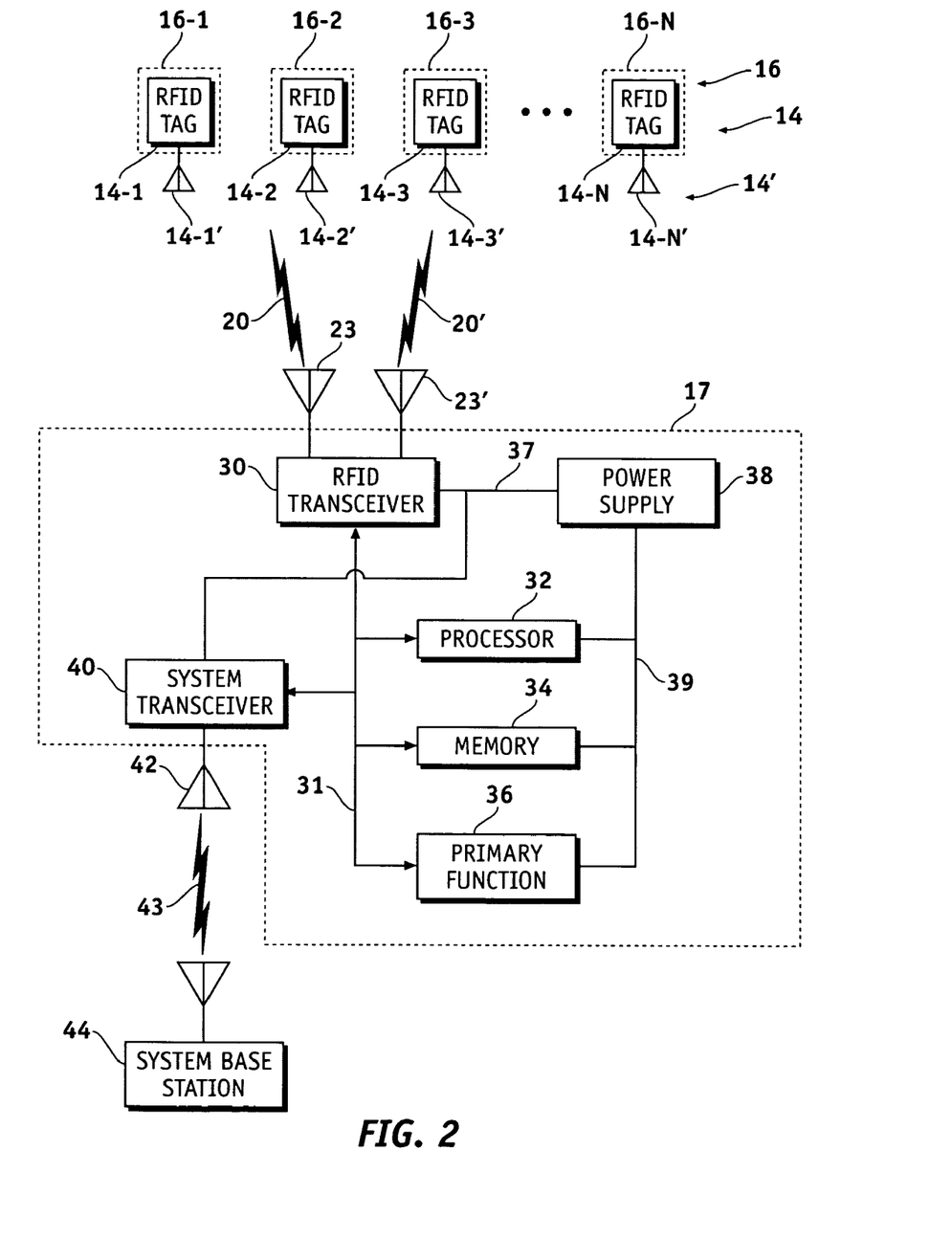
FIG. 2 is a simplified schematic diagram of the mobile device locating system of FIG. 1 showing further details.

FIG. 2 is a simplified schematic diagram of mobile device locating system 10 of FIG. 1 showing further details. Each moveable object or person 18, 19 desired to be located is equipped with RFID tag interrogator terminal 17, 17'. For convenience of description these are collectively referred to in FIG. 2 by reference number 17. Various infrastructure locations 16 within space 12, e.g., infrastructure locations or items 16-1, 16-2, 16-3 ... 16-N, are equipped with infrastructure tags 14, e.g., tags 14-1, 14-2, 14-2 ... 14-N having antennas 14' e.g., 14-1'. 14-2'. 14-3', ... 14-N', respectively. Interrogator 17 comprises RFID interrogation transceiver 30 with antenna(s) 23, 23' for sending and receiving signals 20, 20' to and from tags 14. Interrogator 17 also comprises processor 32 and memory 34 which are coupled by data bus 31 to each other and to transceiver 30. Power supply 38 supplies power to these components via power leads 37, 39. As will be explained later, additional functions are desirably but not essentially included in terminal 17. While use of separate transmit antenna 23 and receive antenna 23' is convenient, it is not essential and a single antenna may be used for both functions. Hereafter, for convenience of description reference number 23 is used to refer collectively to antenna (s) 23 and 23'.

RFID transceiver 30 of interrogator 17 sends interrogation signal 20 via antenna 23 to infrastructure tags 14 in its vicinity, e.g., tags 14-1, 14-2, 14-2 ... 14-N, associated with known infrastructure locations 16-1, 16-2, 16-3, ... 16-N. Interrogation signal 20 is received by some or all of antennas 14-1', 14-2', 14-3', ... 14-N' associated respectively with tags 14-1, 14-2, 14-2 ... 14-N. Tags 14 respond with at least, their unique identifiers (unique IDs), which are received by dual function transmit/receive antenna 23 or alternatively by separate receiving antenna 23' of transceiver 30 (either arrangement is useful). It is desirable that each infrastructure tag 14 also respond with its location but this is not essential since the tag's positions are fixed on infrastructure elements 16 having known locations and each tag's unique ID can be correlated with the tag's location stored in memory, for example, within memory 34 of interrogator 17 or within memory in base station 44 or elsewhere. It will be noted that the unique tag ID may merely be the tag location coordinates (or translatable into its location coordinates) since each location is unique and a separate unique tag ID is not needed although not precluded. Either arrangement is useful. It is also desirable but not essential that interrogator 17 be able to vary the strength of its interrogation signal and/or adjust its receive sensitivity and/or measure the relative signal strength of the responses received from the various tags 14. This is conveniently accomplished by RFID transceiver 30 in cooperation with processor 32 and memory 34.

The responses received from tags 14 are used by interrogator 17 to determine its position with varying degrees of accuracy depending upon the needs of the user. For example, by initially broadcasting its interrogation signal at low power, interrogator 17 may receive no responses and then successively increase the transmitted power level until, for example, only one tag (e.g., tag 14-2) or a small number of tags (e.g., tags 14-2, 14-3) respond. This immediately establishes the position of interrogator 17 as being in close proximity to the responding tag(s). A similar result may be accomplished by measuring the signal strength of the received responses since, in general, the closer the tag, the stronger the received signal. In this manner the closest tags and therefore the approximate location of terminal 17 may be determined. The level of accuracy obtained by the above-described proximity detection may be sufficient in many applications where locations 16 with tags 14 are relatively closely spaced. When greater accuracy is desired and/or infrastructure locations 16 and tags 14 are more widely spaced, transceiver 30 in cooperation with processor 32 and memory 34 may determine the phase difference of arrival (PDOA) and/or time difference of arrival (TDOA) of signals 20, 20' from various tags 14 and use this information to locate its position relative to the responding tags. PDOA and TDOA ranging techniques are well known in the art. Generally, signals received from at least two and preferably three spaced-apart infrastructure tags 14 are sufficient to permit a unique determination of range by PDOA and/or TDOA from responding tags 14. When the range to and position of the responding tags is known, the position of interrogator 17 relative to infrastructure elements 16 where tags 14 are located may be determined mathematically. Responses from three spaced-apart tags provide a single terminal location solution and responses from two spaced-apart tags provide two possible terminal location solutions, one true and one false. However, even a two tag solution can be used to determine a unique location by using other available information to eliminate the "false" solution. For example, if one of the two possible solutions from two-tag responses is within the actual workspace and the second possible solution is outside the actual workspace or in an inaccessible location or would require that the terminal jump a wall to move from its last determined location, and so forth, the second solution can be discarded on logical grounds as being physically unrealizable or unlikely. Hence, even two tag responses are often sufficient to provide a unique position determination using trilateration combined with logical inferences from other available information.

Terminal 17 may also include primary function 36 and/or system transceiver 40. Primary function 36 can be any convenient function incorporated in terminal 17 to suit the needs of the user. For example and not intended to be limiting, primary function 36 can be a bar code reader, an inventory checker, a cell phone or other communicator, a hazmat detector or other measuring instrument of some sort or whatever other function or combination of functions is needed by the user. Terminal 17 may also include system transceiver 40 for communicating via antenna 42 and wireless link 43 with base station 44 to which it may report or receive various data generated or used by primary function 36 and/or processor 32. System transceiver 40 may also be used to report the location of terminal 17 determined by RFID transceiver 30, processor 32 and memory 34. For the present invention, real time location of terminal 17 is preferably (but not essentially) performed within terminal 17 itself, using response signals obtained from infrastructure RFID elements 14 having known fixed locations on infrastructure elements 16. Alternatively, terminal 17 may receive the response signals from RFID beacons 14, transmit this information via transceiver 40 to base station 44 where the actual position determining calculations and/or logical operations are performed. Either arrangement works. System transceiver 40 and primary function 36 are desirably also coupled to data bus 31 and power supply leads 37, 39. While it is preferred that terminal 17 generate interrogation signal 20, this is not essential, and the interrogation signal may originate elsewhere in system 10 (e.g., from a separate interrogation transmitter, not shown) provided that terminal 17 can obtain range and/or location information from responding tags 14. Terminal 17 can obtain proximity information by varying its transmit power and/or receive sensitivity where it is sending out signal 20 or by varying its receive sensitivity where another element is providing interrogation signal 20. Either arrangement is useful.

Figure 3:
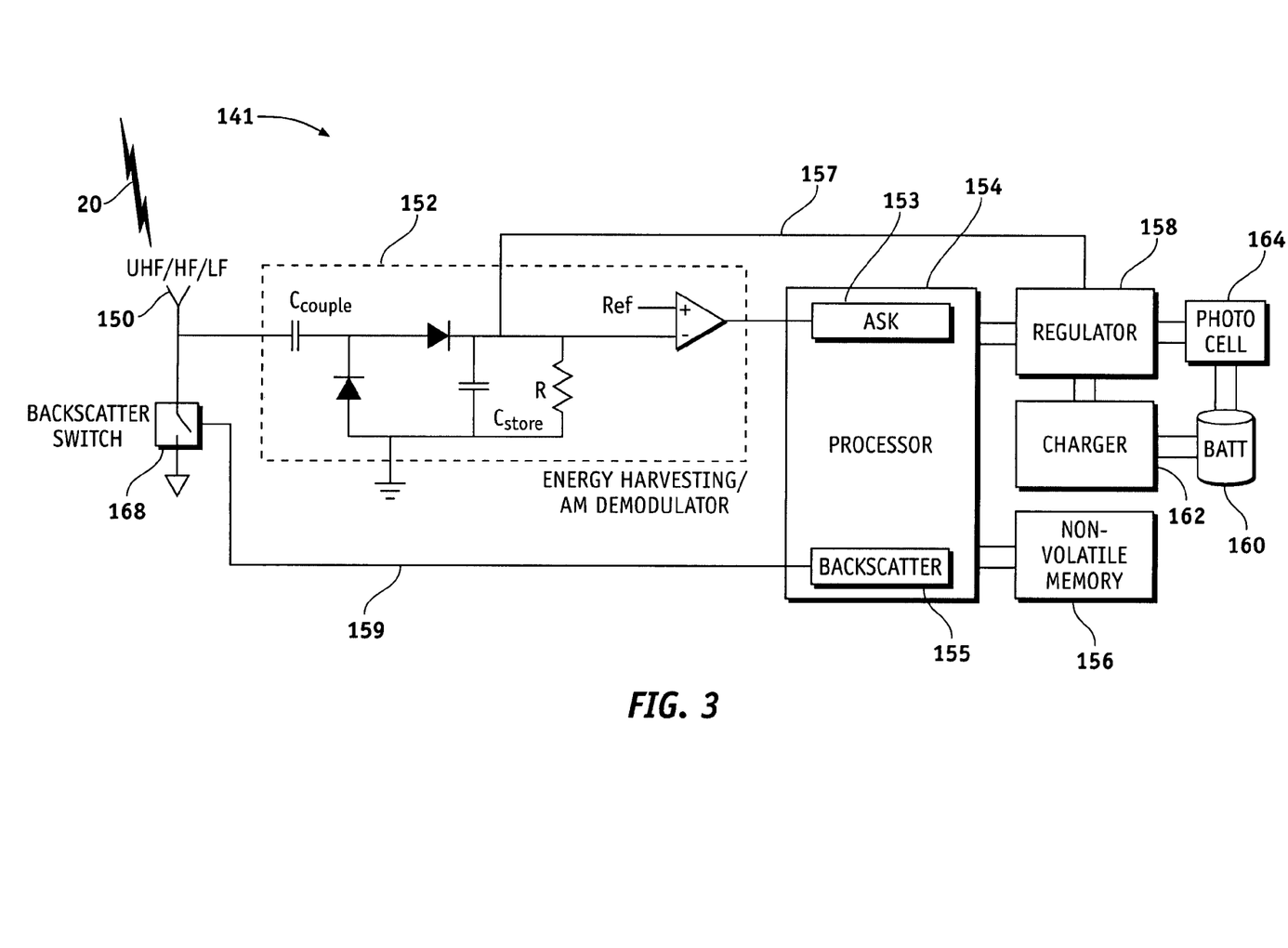
FIGS. 3-4 are simplified schematic diagram of infrastructure RFID tags according to several embodiments of the present invention.
Figure 4:
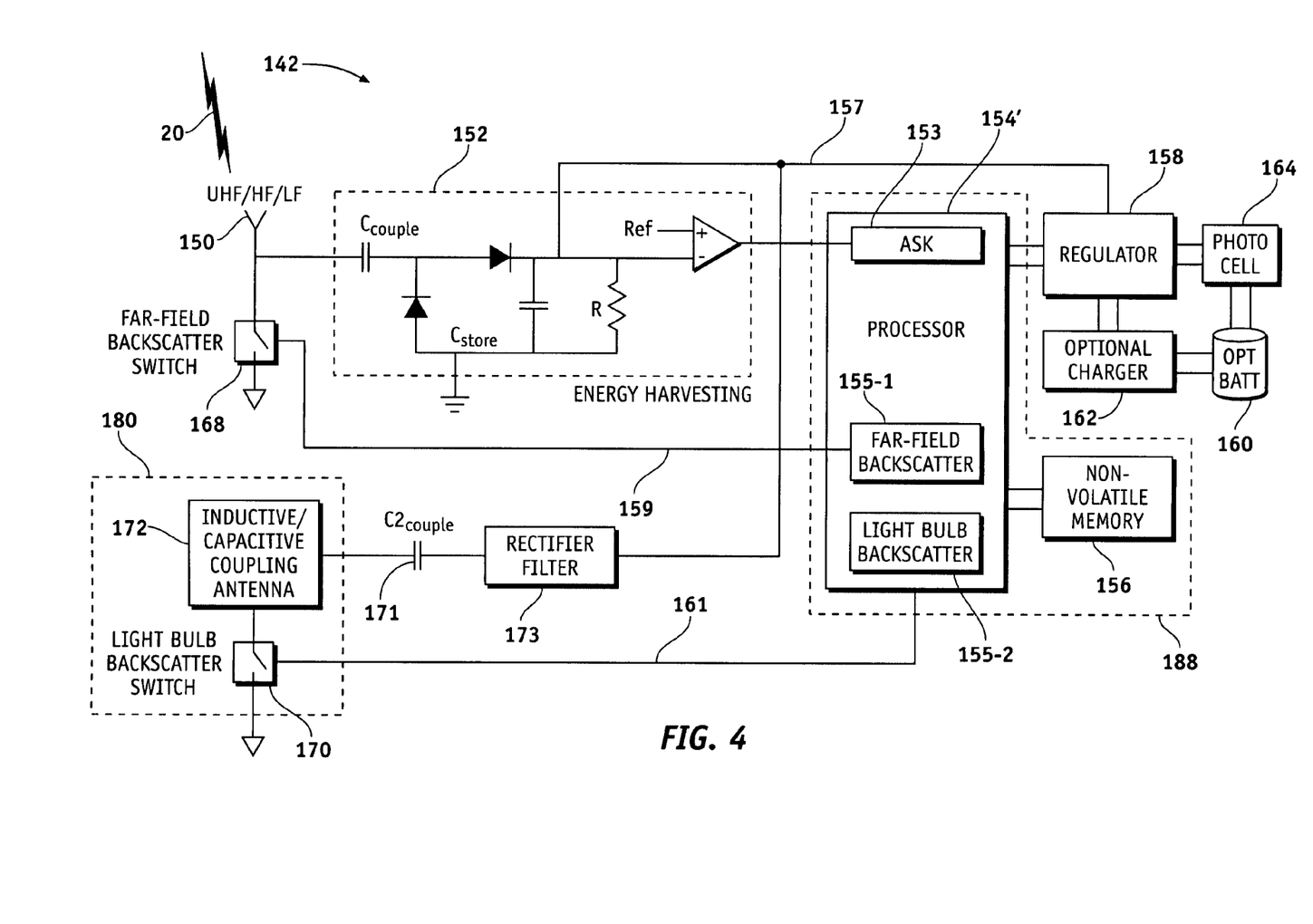

FIGS. 3-4 are simplified schematic diagrams of infrastructure RFID tags 141, 142 according to several embodiments of the present invention. Reference number 14 in FIGS. 1-2 is intended to include implementations 141, 142 shown in FIGS. 3-4 and equivalents. Tag 141 of FIG. 3 comprises antenna 150, energy harvesting and AM demodulator (EH&DeMod) circuit 152, processor 154, non-volatile memory 156, regulator 158 and backscatter switch 168. When tag 141 is configured as a passive tag, line 157 from EH&DeMod circuit 152 supplies DC energy to regulator 158 which powers processor 154 and backscatter switch 168. With this arrangement, no self-contained or external DC power input is required. Such tags are well known in the art. When tag 141 receives signal 20, it is coupled to amplitude shift keyed (ASK) portion 153 of processor 154 which determines that the tag is being interrogated and responds by having backscatter portion 155 of processor 154 activate backscatter switch 168 via lead(s) 159. When backscatter switch 168 is closed, antenna 150 is shorted to local ground (e.g., the counterpoise of a dipole antenna) thereby changing the load presented to transmitting antenna 23 (see FIG. 2) and therefore its spatial impedance, i.e. its "RADAR cross section" (RCS). This change in spatial impedance (RCS) is sensed by transceiver 30 of interrogator 17. By closing and opening backscatter switch 168 at a predetermined rate and/or in a predetermined sequence, tag 141 provides its unique ID or other information from which its known position can be determined. The actual position coordinates of the beacon tag relative to the workspace can be used as its unique ID, but this is not essential. No external power other than interrogation signal 20 is required to operate tag 141 in the fully passive mode. However, optional battery or other energy storage device 160 and charger 162 may also be provided to enable tag 14 to operate at higher power levels and longer range in a semi-passive mode. Where tag 141 is mounted in proximity to light fixtures 16, optional photocell 164 may also be provided to charge battery or energy cell 160 and/or directly drive regulator 158. This is convenient but not essential.

Referring now to tag 142 of FIG. 4, the same reference numbers are used to identify like functions or elements as in FIG. 3, and the discussion of FIG. 3 concerning these common elements is incorporated herein by reference. Tags 141 and 142 differ in that tag 142 of FIG. 4 includes inductive/capacitive (I/C) coupling antenna 172 and/or light bulb backscatter switch 170, collectively identified by reference number 180. These functions provide alternative means by which tag 142 can harvest energy and respond to interrogation signal 20. For example, when tag 142 is operated in the conventional manner, circuit 152 harvests energy from incoming signal 20 and far-field backscatter portion 155-1 of processor 154' activates far-field backscatter switch 168 over lead(s) 159 in the same manner as for tag 141. However, tag 142 provides an alternative means of harvesting energy and responding to interrogation signal 20. Inductive/capacitive (I/C) coupling antenna 172 is provided in close proximity to, for example, light fixture 16 with which tag 142 is associated, so that A/C energy derived from the light fixture (e.g., see FIG. 5) is coupled from antenna 172 via capacitor 171, rectifier-filter 173 and lead 157 to regulator 158 to drive processor 154', etc. Antenna 172 operates independently from antenna 150 and provides additional energy, or an alternate source of energy, to drive circuit 152. While light 16 is on, tag 142 can operate in a semi-passive or active mode since it is not dependent merely on harvesting energy from incoming interrogation signal 20. Light bulb backscatter switch 170 driven by light bulb backscatter portion 155-2 of processor 154' via lead(s) 161 is as an alternative means by which tag 142 can respond to interrogation signal 20. Depending upon the nature of light fixture 16 to which tag 142 is coupled, the light output or other electromagnetic radiation produced by the light fixture may be modulated by switch 170 to provide a response signal detectable by transceiver 30. This is explained more fully in connection with FIGS. 7-8.

Figure 5:
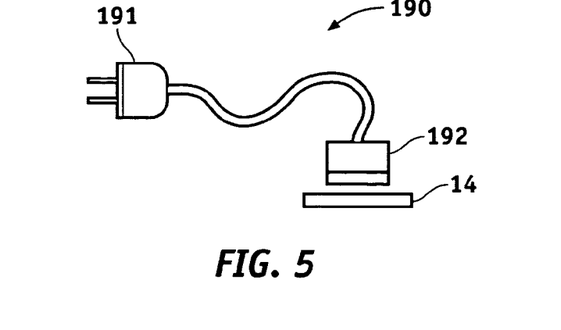
FIG. 5 is a simplified schematic diagram illustrating capacitive and/or inductive coupling of an RFID infrastructure tag to an infrastructure light fixture for energy harvesting.

FIG. 5 illustrates in simplified schematic form how contact-less inductive/capacitive coupling may be achieved for energy harvesting while still using far-field backscattering. Electrical outlet or socket adaptor 191 is provided which couples, for example, to the primary power mains of the light fixture either alongside the light fixture connection or between the light fixture connection and the power mains. In either case, it draws power from the same source as the light fixture to which the tag is attached or coupled. Coil or field plate 192 is provided in close proximity to a mating coil or field plate (e.g., antenna 172) on tag 14 so that the AC energy derived from the light fixture supply is coupled to the tag, for example using the circuit as shown in FIG. 4.

Figure 6A:
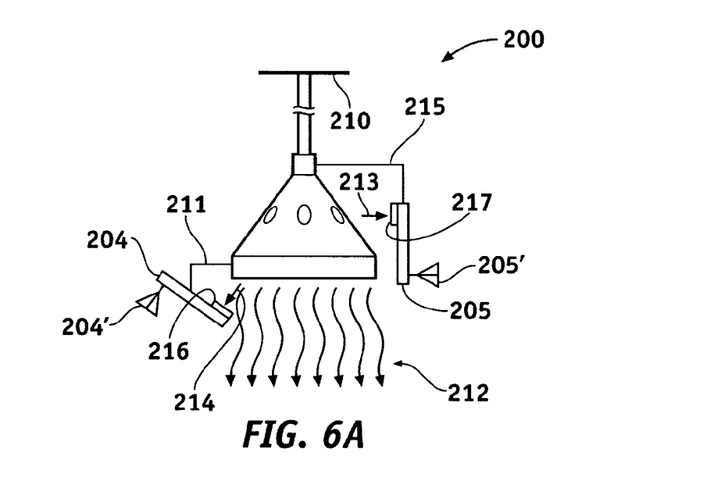
FIGS. 6A-B are simplified side views of typical light fixtures with RFID infrastructure tags of the present invention optically coupled thereto, according to a first embodiment.
Figure 6B:
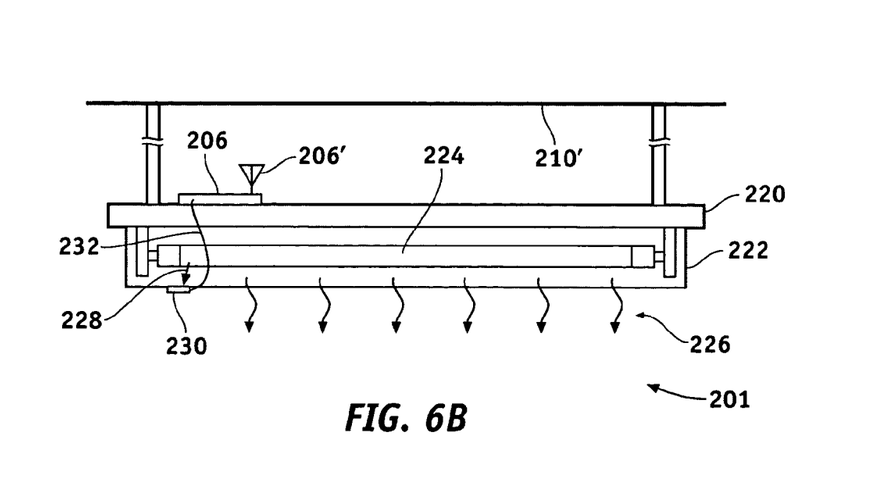

FIGS. 6A-B are simplified side views of typical light fixtures 200-203 with RFID infrastructure tags 204-207 of the present invention coupled thereto. Infrastructure tags 204-206 are examples of infrastructure tags 14 described earlier. Referring now to FIG. 6A, light fixture 200 suspended from ceiling or other support 210 emits light 212 generally in a downward direction. Infrastructure RFID tag 204 with antenna 204' is mounted on support 211 coupled to light fixture 200 (or other support) so that portion 214 of light 212 impinges on optional photocell 216 analogous to photocells 164 described earlier. Photocell 216 is not essential but is desirable since it can provide power to infrastructure tag 204 without need to connect any wires to the mains powering fixture 200 and/or act as a turn-on switch to automatically activate tag 204 when light 200 is energized. In some cases fixture 200 may emit stray light 213 from the side or rear of fixture 200, in which case infrastructure tag 205 with antenna 205' (analogous to tag 204 and antenna 204') may be mounted on support 215 so as to have photocell 217 intercept light 213 in the same manner and for the same purpose as photocell 216 of tag 204 intercepts light 214. Either arrangement is useful.

FIG. 6B shows typical fluorescent type light fixture 201 suspended from ceiling or other support 210'. Fixture 201 typically has base 220 with clear or translucent cover 222 within which fluorescent light tube 224 is located. Fluorescent tube 224 emits light 226 in multiple directions wherein portion 228 of light 226 falls on photocell 230 attached, for example, to cover 222 by any convenient means (e.g., adhesive, mounting screws, etc.). Wire(s) 232 are provided to couple photocell 230 to infrastructure tag 206. Tag 206 may be located anywhere in, on or near fixture 201.

Figure 7A:
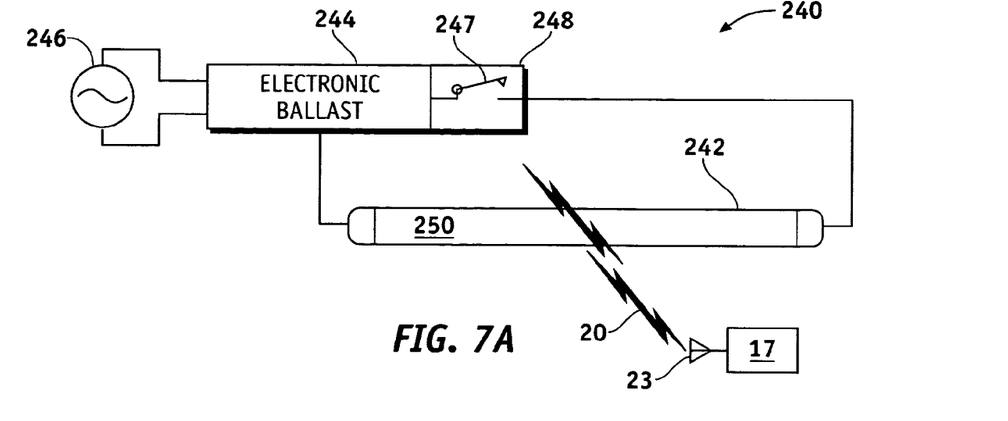
FIGS. 7A-B are simplified diagrams illustrating how operation of a fluorescent lamp can affect the "RADAR cross section" (RCS) of the bulb.
Figure 7B:
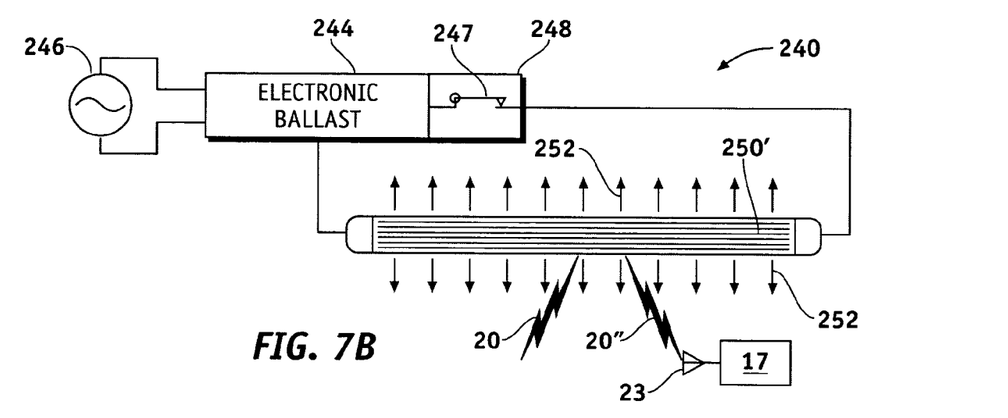

FIGS. 7A-B are simplified diagrams of light fixture 240 illustrating how operation of fluorescent lamp 242 can affect the spatial impedance i.e. the "Radar cross section" (RCS) of lamp 242. Light fixture 240 is a typical modern fixture employing electronic ballast 244. Power is generally supplied to ballast 244 of fixture 240 from A/C mains 246, although this is not essential. A DC power source can also be used. Electronic ballast 244 transforms the input supply voltage into whatever form is needed to run lamp 242 (e.g., see FIG. 8). Contained within ballast 244 is switching or chopper circuit 248, represented in FIGS. 7A-B as simple switch 247. Switch 247 is shown in the open position in FIG. 7A and in the closed position in FIG. 7B. Nearby terminal 17 with antenna 23 sends, e.g., RF signal 20 toward light fixture 240. When switch 247 is open, gas 250 within lamp 242 is not ionized and is essentially transparent to RF signal 20 so that most of signal 20 passes through lamp 242 undisturbed.

When switch 247 is closed, voltage is applied to gas 250 and it becomes ionized gas 250' and emits light 252. Ionized gas 250' is electrically conductive so that portion 20" of RF signal 20 from antenna 23 of terminal 17 is now reflected back toward antenna 23. The spatial impedance, i.e. the RCS of the lamp 242, changes significantly depending upon the state of ionization of gas 250 of lamp 242. As is explained more fully in connection with FIG. 8, this can be used to turn fixture 240 into an RFID position location beacon. Further, because switch 247 is effectively opening and closing at a rate of, typically, 30-130 kHz, lamp 242 of fixture 240 changes reflectance and re-radiates significant electromagnetic energy somewhere in this frequency range and harmonics thereof. For convenience of explanation, it is assumed hereafter that lamp 242 is being excited at approximately 60 kHz, but this is not intended to be limiting, and any convenient frequency can be used.

Figure 8:
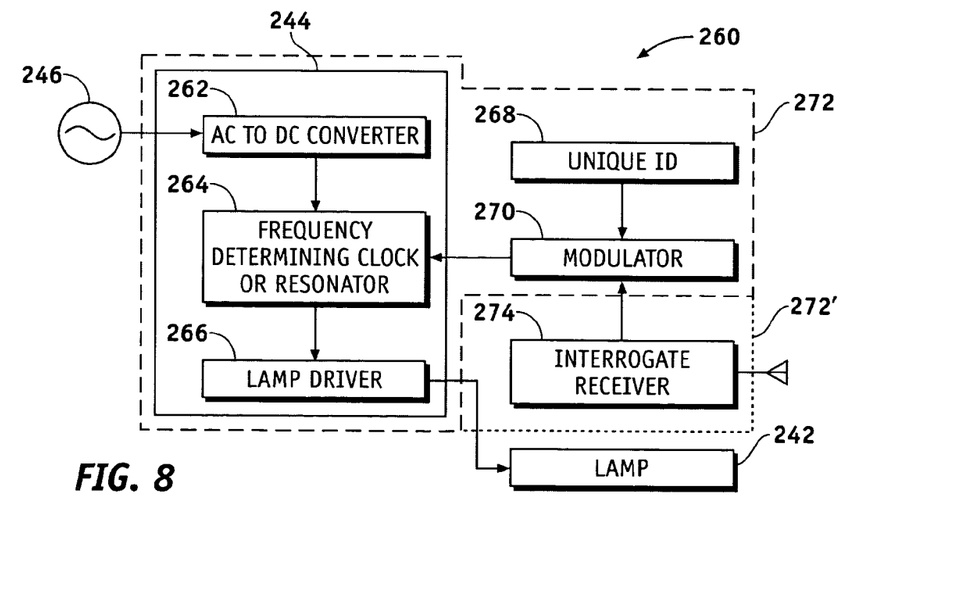
FIG. 8 is a simplified block diagram of a fluorescent lamp ballast modified to cause the lamp to act as a location beacon transmitter, according to the present invention.

FIG. 8 is a simplified schematic block diagram of fluorescent fixture 260 wherein operation of conventional lamp ballast 244 is modified to cause lamp 242 to act as a location beacon according to the present invention. Mains source 246 typically provides primary AC energy to AC to DC converter circuit 262 which converts the incoming AC to DC for use by frequency determining clock or resonator 264 and lamp driver 266. The output of clock or resonator 264 is typically fed to lamp driver 266 that provides the necessary 60 kHz excitation voltage and current control to lamp 242. Elements 262, 264, 266 making up ordinary ballast 244 are conventional and take many different forms. For example, elements 264, 266 may be combined into a resonant analog circuit tuned to the desired output frequency to provide the 60 kHz excitation to lamp 242. Alternatively, ballast 244 may be digital, managed by an integrated circuit (IC) whose output frequency is determined by an internal digital clock. Such arrangements are well known in the art and elements 262, 264, 266 of ballast 244 shown in FIG. 8 are merely intended to indicate generally that the above-described functions exist in some form within ballast 244 and not be limited to merely the above-described elements. Gas 250 within lamp 242 is ionized and de-ionized at a 60 kHz rate.

Ballast 272 of the present invention, differs from conventional ballast 244 by addition of modulator 270 and unique ID 268. Unique ID 268 is conveniently stored in non-volatile memory and represents the location or location address of the light fixture to which ballast 272 is attached. Thus, unique ID 268 provides the position information needed to be backscattered or otherwise transmitted by RFID beacon 14, e.g., fixture 240, 260 in FIGS. 7-8 employing ballast 272. Modulator 270 is coupled to frequency determining element 264 so as to cause the output frequency, and therefore the excitation (ionization/deionization) frequency of light fixture 260 to vary about the un-modulated e.g., 60 kHz, excitation frequency.

After modulation, the electromagnetic energy inherently radiated by fixture 240, 260 employing ballast 272 now contains the unique ID information associated with its position within workspace 10 (see FIG. 1). Thus, signal 20" received by antenna 23 of terminal 17 inherently contains the desired position location information concerning light fixture 240, 260. In this way, light fixture 240, 260 becomes an always-on RFID beacon backscattering or otherwise transmitting its known location via the modulated ballast switching frequency. Terminal 17 can detect this position information merely by detecting and/or decoding the modulated switching frequency backscattered or otherwise transmitted by fixture 240, 260. To avoid signal confusion, the operating frequencies of the various fixture can be spaced slightly apart and/or the workspace divided up into cells wherein the frequencies are separated within each cell but reused in other cells.

In a further embodiment, interrogation receiver 274 coupled to modulator 270 is included in ballast 272'. In this embodiment, modulator 270 is dormant until receiver 274 receives an interrogation signal broadcast by terminal 17. This interrogation signal causes modulator 270 to become active so that fixture 240, 260 begins radiating position modulated signal 20". In this way, only those fixtures within range of terminal 17 are backscattering or otherwise transmitting a position modulated signal. Modulator 270 may remain active as long as an interrogation signal is being received or may time-out after a predetermined interval or a combination thereof.

While the foregoing embodiments of the present invention have been described for fluorescent lamps, persons of skill in the art will understand based on the description herein that they are applicable to any type of lamp in which ionized gas is used to provide light. Fluorescent, sodium vapor, mercury vapor and other types of gas discharge lamps are nonlimiting examples of gaseous ionization type of light sources. Thus, the terms "fluorescent" and gas "ionization" and "deionization" are intended to include all forms of gas ionization lamps.

Figure 9:
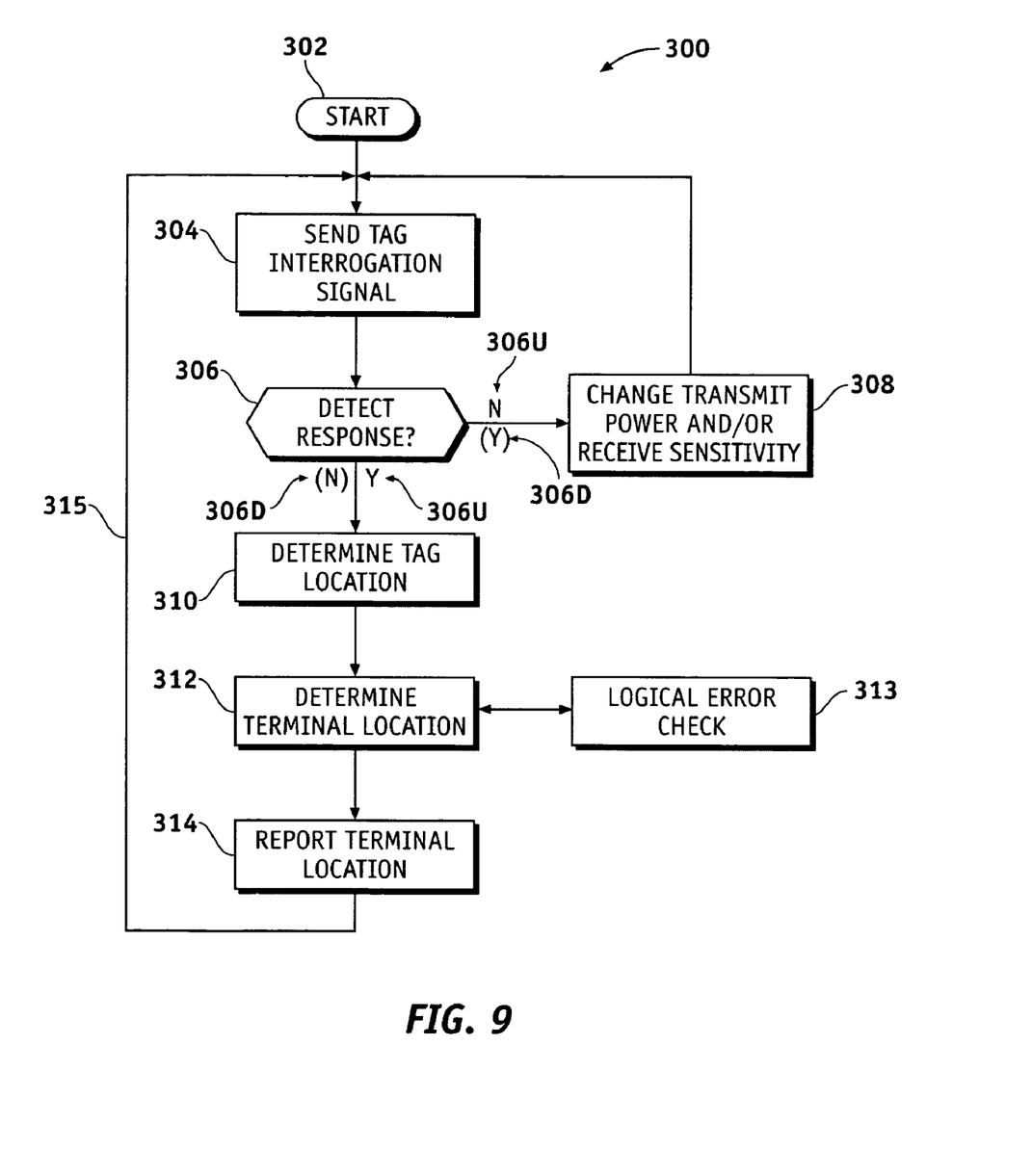
FIG. 9 is a simplified flow diagram of the method of the present invention according to a first embodiment.

FIG. 9 is a simplified flow diagram of method 300 of the present invention according to a first embodiment. Method 300 begins with START 302, which desirably occurs on power-up. For example, for those infrastructure tags coupled to light fixtures, START desirably occurs when the fixtures are switched on but this is not essential since it may be desirable to have the locating system working even when some or all of the lights are off. In initial step 304, terminal 17 sends an interrogation signal to the nearby tags 14. Step 304 is intended to include determining the presence of sidebands produced by the spatial impedance modulation of antenna 23 by terminal 17 for the embodiments illustrated in FIGS. 7-8. In query 306 it is determined whether or not a response is detected by terminal 17. Ignoring for the moment optional step 308, when the outcome of query 306 is YES (TRUE), abbreviated in FIG. 9 as "Y", method 300 proceeds to step 310 wherein the location(s) of the responding tag(s) are determined. This may involve looking up in memory the locations based on the unique IDs received form the responding tags or the tag responses themselves may include coordinates of the tags relative to the workspace. In step 312 the terminal location is determined using the information obtained in step 310. As described earlier, optional logical error check step 313 may be performed depending upon the number of tags that have responded to resolve any ambiguities in terminal position. In step 314, the terminal location is reported in a manner desired by the system designer or user, as for example via transceiver 40 of FIG. 2, but any method of reporting including visual and/or audible announcement(s) may also be used. Following step 314, method 300 returns to START 302 and initial step 304 as shown by path 315. While it is desirable that one or both of location steps 310, 312, 313 be performed in terminal 17 this is not essential and the received tag responses can be sent to base station 44 and the position location determinations performed there. Either arrangement is useful.

Returning now to step 304 an alternative strategy is to send a first tag interrogation signal at either minimum or maximum power. Consider first starting with minimum interrogation power and/or minimum receiver sensitivity. Then, query 306 desirably responds according to outcomes 306U, that is, if the outcome of query 306 is NO FALSE then method 300 proceeds to step 308 wherein the transmit power and/or receiver sensitivity are changed so as to increase the effective detection range. In this circumstance, transmit power and/or receiver sensitivity are increased and step 304 and query 306 repeated. As long as the outcome of query 306 is NO (FALSE) terminal 17 will ratchet up the power and/or receiver sensitivity until the outcome of query 306 is YES (TRUE) (outcome 306U) whereupon method 300 proceeds to step 310 and following as already described.

Consider now starting with maximum interrogation power and/or maximum receiver sensitivity. Then query 306 desirably responds according to outcomes 306D, that is, if the outcome of query 306 is YES (TRUE) then method 300 proceeds to step 308 wherein the transmit power and/or receiver sensitivity are changed to decrease the effective detection range, i.e., use less transmit power and/or less receiver sensitivity. Steps 304 and query 306 are repeated. As long as the outcome of query 306 is YES (TRUE) (outcome 306D) terminal 17 will ratchet down the power and/or receiver sensitivity until the outcome of query 306 is NO (FALSE) (outcome 306D) whereupon method 300 proceeds to step 310 and following based on the location of the last tag(s) detected. With either the power-up or power-down approach, method 300 determines the terminal location on the basis of the closest tags, i.e., those first detected using power-up and those last detected using power-down. Either arrangement is useful.

Figure 10:
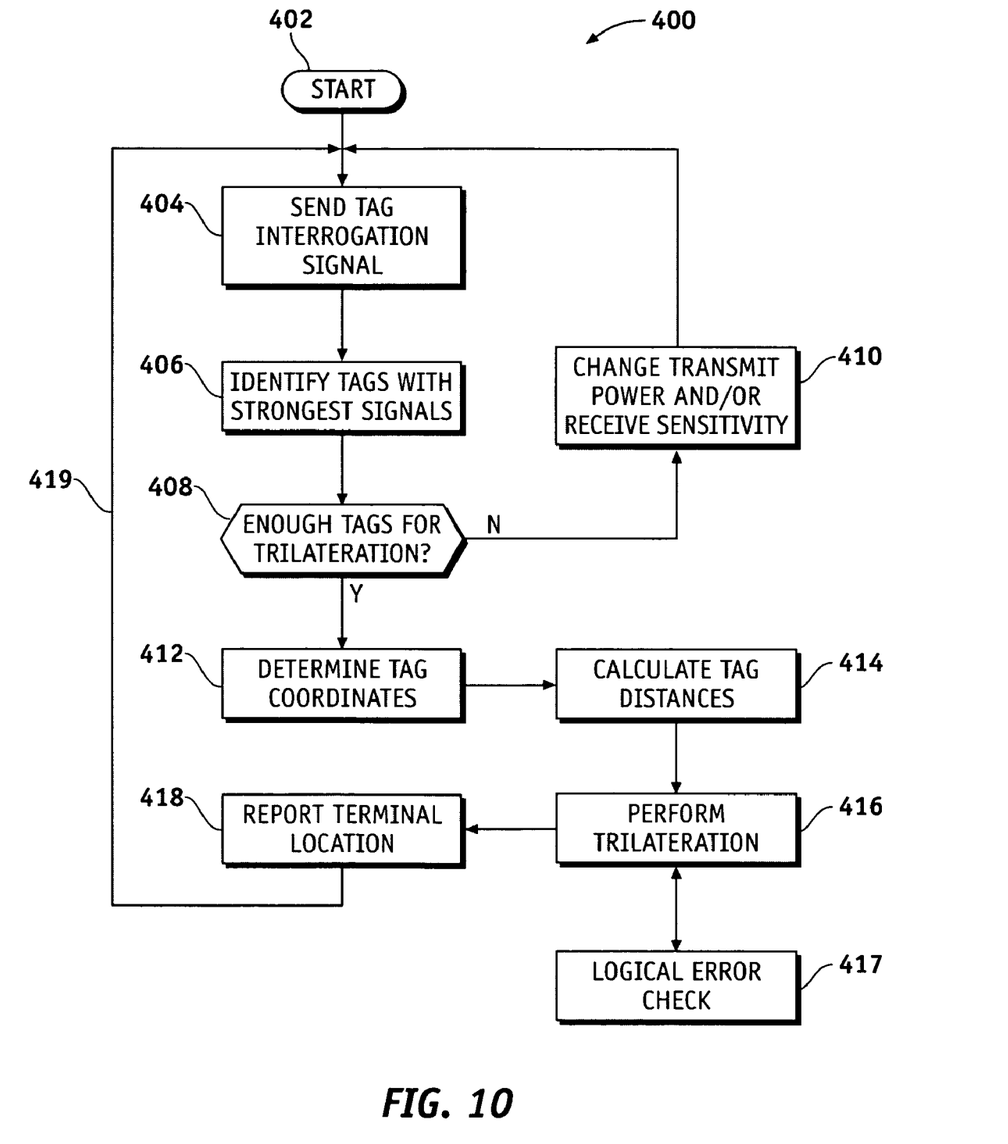
FIG. 10 is a simplified flow diagram of the method of the present invention according to a further embodiment.

FIG. 10 is a simplified flow diagram of method 400 of the present invention according to a further embodiment. Method 400 begins with START 402 that desirably occurs on power-up. For example, for those infrastructure tags coupled to light fixtures, START desirably occurs when the fixtures are switched on but this is not essential since it may be desirable to have the locating system working even when some or all of the lights are off. In initial step 404, terminal 17 sends an interrogation signal to nearby tags 14. Step 404 is intended to include determining the presence of sidebands produced by the spatial impedance modulation of antenna 23 by terminal 17 for the embodiments illustrated in FIGS. 7-8. In subsequent step 406 those responding tags having the strongest signal are identified. It will be appreciated that the power-up or power-down strategy described in connection with method 300 of FIG. 10 can also be used in method 400 with the proviso that responses from more than one tag are desired. This is determined in query 408 wherein it is decided whether or not sufficient responses have been received to permit trilateration to be used to determine the range of terminal 17 from the responding tag locations. In general, it is desirable to have responses from at least two, preferably at least three, tags on different bearings to perform reliable trilateration. If the outcome of query 408 is NO (FALSE) then method 400 proceeds to step 410 analogous to step 308 of method 300 and steps 404-408 are repeated until a YES (TRUE) outcome is obtained from query 408. When enough tags have been detected to permit reliable trilateration, then method 400 proceeds to step 412 wherein the coordinates of the responding tags are determined, for example, directly from the tag IDs or location response or, for example, from a look-up table having tag locations correlated with tag IDs. In following step 414, the distances from the tag to the interrogator are determined using, for example PDOA or TDOA comparisons. This provides, for example, two, three or more radii from the known tag locations and in step 416 the trilateration calculation is performed to determine the terminal location, e.g., the intersection of the radii. As described earlier, optional logical error check step 417 may be performed, depending upon the number of tags that have responded, in order to resolve any ambiguities in terminal position. In step 418 analogous to step 314 of method 300, the terminal location is reported as needed and method 400 loops back to START 402 and initial step 404 as shown by path 419. Either of methods 300 or 400 provides real-time location information for terminal 17 using the infrastructure RFID tags 14 associated with known infrastructure locations, preferably light fixtures. It will be appreciated by those of skill in the art based on the description herein that existing facilities may be easily retrofitted with RFID infrastructure tags by placing them on or adjacent to available light fixture. In the case of new construction, such tags may be included with the infrastructure, e.g., the light fixtures, when they are installed, and/or the ballasts of the fixtures modified to permit the fixtures themselves to act as position location beacons without addition of an RFID tag.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A system by which an object can locate itself within an area, comprising:

multiple radio frequency identification (RFID) tags positioned at known locations within the area; and a moveable RFID tag reader associated with the object and in signaling contact with at least some of the RFID tags, said tag reader for interrogating the at least some of the RFID tags and receiving information therefrom related to their known locations, and for using such known location information to establish its own position within the area, wherein the multiple RFID tags are associated with light fixtures within the area, and wherein each light fixture has a ballast and the RFID tags transmit information to the reader by modulating operation of the ballast of the light fixture.

2. The system of claim 1, further comprising the ballast, wherein the ballast comprises:

a circuit adapted to provide an excitation voltage to a gas ionization lamp at a variable output frequency that includes an unmodulated excitation frequency; and a modulator coupled to the circuit, and adapted to cause the variable output frequency to vary about the unmodulated excitation frequency so that electromagnetic energy radiated by the gas ionization lamp contains a unique identifier associated with a position of the RFID position location beacon and a portion of an RF signal reflected by the gas ionization lamp is a position modulated signal that contains the unique identifier.

3. The system of claim 2, wherein the moveable RFID tag reader is adapted to determine the position of the RFID position location beacon by decoding the position modulated signal.

4. An RFID position location beacon comprising:

an electronic ballast that includes a circuit adapted to provide an excitation voltage to a gas ionization lamp at a variable output frequency that includes an unmodulated excitation frequency; and a modulator coupled to the circuit, and adapted to cause the variable output frequency to vary about the unmodulated excitation frequency so that electromagnetic energy radiated by the gas ionization lamp contains a unique identifier associated with a position of the RFID position location beacon and a portion of an RF signal reflected by the gas ionization lamp is a position modulated signal that contains the unique identifier.

5. The RFID position location beacon of claim 4, wherein the circuit is adapted to provide the excitation voltage at an unmodulated excitation frequency of about 60 kHz.

6. The RFID position location beacon of claim 4, wherein the circuit is adapted to provide the excitation voltage at a variable output frequency in a range of about 30 to 130 kHz.

7. The RFID position location beacon of claim 4, wherein the circuit comprises:

a resonator adapted to provide an output signal to a lamp driver; and the lamp driver adapted to provide the excitation voltage to the gas ionization lamp at the variable frequency, wherein the modulator is coupled to the resonator and the modulator is adapted to cause the output signal of the resonator to change in order to cause the variable excitation frequency to vary about the unmodulated excitation frequency.

8. The RFID position location beacon of claim 4, wherein the circuit comprises:

a frequency determining clock adapted to provide an output signal to a lamp driver; and the lamp driver adapted to provide the excitation voltage to the gas ionization lamp at the variable frequency, wherein the modulator is coupled to the frequency determining clock and the modulator is adapted to cause the output signal of the frequency determining clock to change in order to cause the variable excitation frequency to vary about the unmodulated excitation frequency.

9. The RFID position location beacon of claim 4, further comprising:

an interrogation receiver coupled to the modulator, wherein the interrogation receiver is adapted to cause the modulator to become active when the interrogation receiver receives an interrogation signal.

10. The RFID position location beacon of claim 4, wherein the interrogation receiver continues to cause the modulator to be active as long as the interrogation receiver is receiving the interrogation signal.

11. The RFID position location beacon of claim 10, wherein the interrogation receiver continues to cause the modulator to be active until a time-out of a predetermined interval has occurred.

12. The RFID position location beacon of claim 4, further comprising:
the gas ionization lamp, wherein the gas ionization lamp is a fluorescent lamp.

13. The RFID position location beacon of claim 4, further comprising:
the gas ionization lamp, wherein the gas ionization lamp is a lamp selected from a group that includes a fluorescent lamp, a sodium vapor lamp, and a mercury vapor lamp.

14. A method for operating an RFID position location beacon comprising the steps of:
providing an excitation voltage to a gas ionization lamp at a variable output frequency that includes an unmodulated excitation frequency; and
causing the variable output frequency to vary about the unmodulated excitation frequency so that electromagnetic energy radiated by the gas ionization lamp contains a unique identifier associated with a position of the RFID position location beacon and a portion of an RF signal reflected by the gas ionization lamp is a position modulated signal that contains the unique identifier.

15. The method of claim 14, wherein providing the excitation voltage comprises providing the excitation voltage at a variable output frequency in a range of about 30 to 130 kHz.

* * * * *

UNITED STATES PATENT AND TRADEMARK OFFICE
CERTIFICATE OF CORRECTION

PATENT NO.         : 7,403,120 B2                                                                  Page 1 of 1
APPLICATION NO.  : 10/954967
DATED              : July 22, 2008
INVENTOR(S)        : Duron et al.

It is certified that error appears in the above-identified patent and that said Letters Patent is hereby corrected as shown below:

IN THE CLAIMS:

1. In Column 12, Line 60, in Claim 10, delete "4," and insert -- 9, --, therefor.

Signed and Sealed this

Twenty-first Day of September, 2010

David J. Kappos
*Director of the United States Patent and Trademark Office*